United States Patent [19]

Hibino et al.

[11] Patent Number: 4,654,674

[45] Date of Patent: Mar. 31, 1987

[54] THERMAL LIFT-OFF CORRECTIBLE RECORD AND ERASE PRINTER

[75] Inventors: Ikuo Hibino; Koichi Umeki, both of Iwate, Japan

[73] Assignee: Alps Electric Co., Ltd., Japan

[21] Appl. No.: 856,759

[22] Filed: Apr. 28, 1986

[30] Foreign Application Priority Data

Apr. 25, 1985 [JP] Japan .................................. 60-89762

[51] Int. Cl.[4] .......................... G01D 15/10; B41J 3/00

[52] U.S. Cl. ................................ 346/76 PH; 400/120; 400/240.1; 400/696; 400/697.1

[58] Field of Search .................... 346/76 PH; 400/120, 400/240.1, 696, 697.1

[56] References Cited

U.S. PATENT DOCUMENTS

| | | | |
|---|---|---|---|
| 3,855,448 | 12/1974 | Hanagata et al. | 219/216 |
| 4,390,297 | 6/1983 | Gaitos et al. | 400/697.1 |
| 4,453,167 | 6/1984 | Motoyoshi | 346/76 PH |
| 4,545,693 | 10/1985 | Bartlett et al. | 400/120 |

*Primary Examiner*—E. A. Goldberg

*Assistant Examiner*—Gerald E. Preston

*Attorney, Agent, or Firm*—Guy W. Shoup

[57] ABSTRACT

A thermal printer for thermal transfer printing, adapted to use a printing ribbon carrying a fusible ink layer and an erasing ribbon carrying a thermoadhesive resin layer. The thermal head of the thermal printer has a printing heating unit disposed opposite to a platen with the printing ribbon extended therebetween and an erasing heating unit disposed beside the printing heating unit and opposite to the platen with the erasing ribbon extended therebetween. In correcting a misprint, the misprint is located opposite to the erasing heating unit and the erasing ribbon is heated and pressed against the misprint with the erasing heating unit to lift off the misprint. After lifting-off the misprint, the corrected portion is located opposite to the printing heating unit for correct printing operation. The area of each heating element of the erasing heating unit is greater than that of the corresponding heating element of the printing heating unit so that the area of the heating element of the printing heating unit can be covered entirely with the area of the heating element of the erasing heating unit.

5 Claims, 5 Drawing Figures

THERMAL LIFT-OFF CORRECTIBLE RECORD AND ERASE PRINTER

BACKGROUND OF THE INVENTION

1. Field of the Invention

The present invention relates to a thermal printer suitable for application to a word processor or a typewriter.

2. Description of the Prior Art

A thermal printer, for example, a thermal printer disclosed in Japanese Patent Publication No. 49-26245, is a printer which prints characters, symbols and the like on a recording sheet by selectively fusing the reversible fusible ink contained in a thermal transfer ribbon interposed between the recording sheet and the thermal head by the heat generated by the thermal head.

Recently, such a thermal printer has been widely used as the output unit of business machines, such as word processors and electronic typewriters. In printing characters and symbols on such word processors and typewriters, misprinted characters and symbols need to be corrected. However, it has been difficult to erase characters and symbols misprinted on a recording sheet on a conventional ordinary thermal printer for correction. Accordingly, it has been necessary to correct misprinted characters and symbols through handwriting or to reprint the text on a new recording sheet, which often makes the corrections conspicuous and requires complicated correcting operation.

SUMMARY OF THE INVENTION

The present invention has been made in view of the disadvnatages of the above-mentioned prior art. Accordingly, it is an object of the present invention to provide a thermal printer capable of simply and surely erasing misprinted characters, symbols, numerals and the like.

The object of the present invention is achieved by a thermal printer adapted to use a printing ribbon carrying a fusible ink layer for printing on a recording sheet and an erasing ribbon carrying a thermoadhesive resin layer for lifting-off characters and the like misprinted on the recording sheet, comprising a thermal head having a printing heating unit capable of being applied to and heating the printing ribbon and an erasing heating unit disposed beside the printing heating unit and capable of being heated at a temperature higher than that of the printing heating unit, said printing heating unit being heated for normal printing operation for printing with the printing ribbon, said erasing heating unit being heated for erasing operation for lifting-off misprinted characters and the like with the erasing ribbon.

The above and other objects, features and advantages of the present invention will become more apparent from the following description of the preferred embodiment thereof taken in conjunction with the accomapnying drawings.

DESCRIPTION OF THE PREFERRED EMBODIMENT

Figure 1:
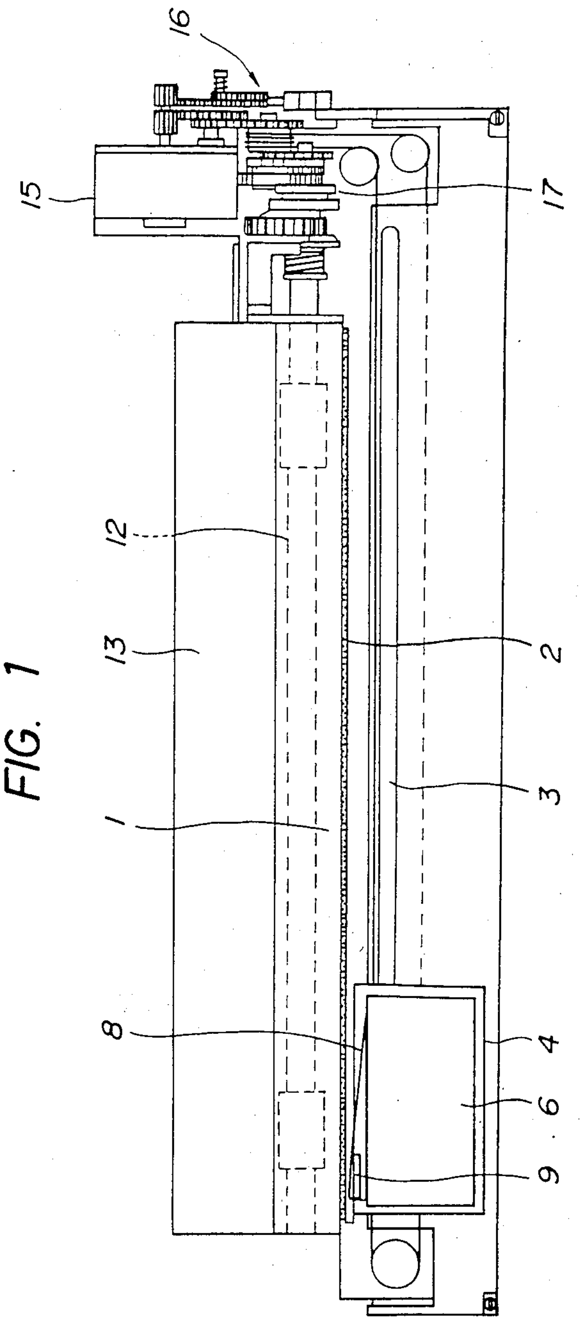
FIG. 1 is a schematic top plan view of a thermal printer, in a preferred embodiment, according to the present invention.
Figure 2:
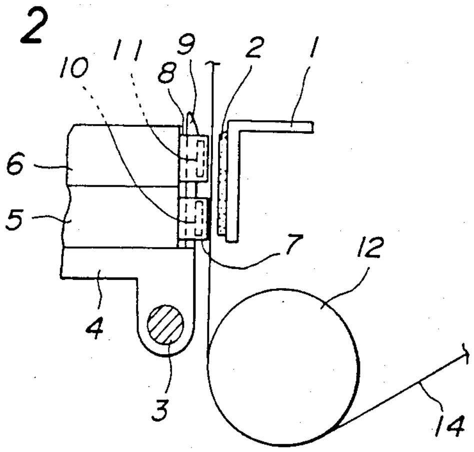
FIG. 2 is a fragmentary side elevation of an essential part of the thermal printer of FIG. 1.
Figure 3:
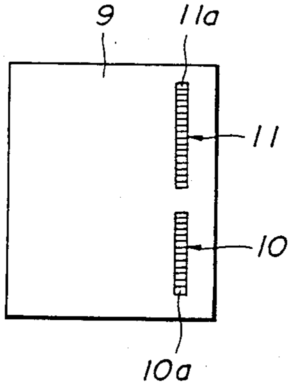
FIG. 3 is a schematic front elevation of a thermal head employed in the thermal printer of FIG. 1.

A preferred embodiment of the present invention will be described with reference to FIGS. 1 to 3. In FIGS. 1 to 3, there are shown a platen 1, a platen rubber plate 2 made of an elastic material such as neoprene and applied to the front surface, namely, the surface facing the heating units of a thermal head 9, of the platen 1, a guide shaft 3, and a carriage 4 which is reciprocated along the guide shaft 3 and is mounted with a printing ribbon cassette 5 and an erasing ribbon cassette 6 one over the other. A coiled printing ribbon 7 carrying a fusible ink and a coild erasing ribbon 8 carrying a thermoadhesive resin are contained in the printing ribbon cassette 5 and the erasing ribbon cassette 6, respectively. The printing ribbon 7 and the erasing ribbon 8 are wound up individually. Both the printing ribbon cassette 5 and the erasing ribbon cassette 6 are mounted detachably on the carriage 4.

The thermal head 9 is provided upright on the carriage 4. A printing heating unit 10 and an erasing heating unit 11 are provided separately in two sections on the front surface, namely, the surface facing the platen rubber plate 2, of the thermal head 9. The printing ribbon 7 and the erasing ribbon are extended between the printing heating unit 10 and a recording sheet 14 and between the erasing heating unit 8 and the recording sheet 14, respectively. As illustrated in FIG. 3, a plurality of heating resistance elements 10*a* and a plurality of heating resistance elements 11*a* are arranged vertically in the printing heating unit 10 and the erasing heating unit 11, respectively. The heating resistance elements of either the printing heating unit 10 or the erasing heating unit 11 are heated selectively. The erasing heating unit 11 is greater in height than the printing heating unit 10 and is heated to a temperature higher than that of the latter.

There are also shown a sheet feeding shaft 12, a sheet guide 13 and the recording sheet 14 (not shown in FIG. 1). The recording sheet 14 is inserted along the sheet guide 13 between the platen 1 and the thermal head 9. The recording sheet 14 is nipped between the sheet feeding shaft 12 and a pressure roller, not shown, and is conveyed between the platen 1 and the thermal head 9 along a predetermined passage. Indicated at 15 is a pulse motor and at 16 is a gear train for transmitting the rotative force of the pulse motor 15. The pulse motor 15 is a driving source for reciprocating the carriage 4 along the guide shaft 3 and for rotating the sheet feeding shaft 12 to convey the recording sheet 14. A clutch mechanism 17 transmits the driving force of the pulse motor 15 selectively to the carriage 4 or to the sheet feeding shaft 12.

The functions of this embodiment will be described hereinafter.

In the normal operation for printing on the recording sheet 14, the printing ribbon 7 extended between the recording sheet 14 and the printing heating unit 10 of the thermal head 9 is wound from the printing ribbon cassette 10 and energy is supplied to the printing heating unit 10 to make the printing heating unit 10 generate heat. The fusible ink of the printing ribbon 7 is fused instantaneously and the fused fusible ink is transferred to the recording sheet 14. During this printing operation, the erasing ribbon 8 is not wound from the erasing ribbon cassette 11 and no enerby is supplied to the erasing heating unit 11 of the thermal head 9, and hence the erasing heating unit 11 does not generate heat.

Figure 4:
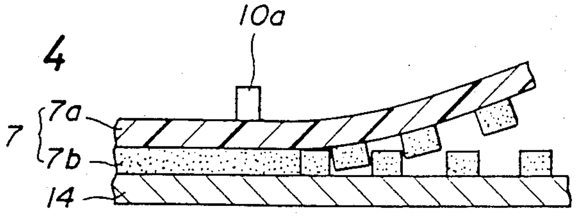
FIG. 4 is an enlarged sectional view of assistance in explaining the principle of thermal transfer printing.

Referring to FIG. 4 showing the process of transfer printing, the printing ribbon 7 is formed by coating a base film *7a*, such as a polyester film, with a fusible ink layer *7b*. The heating resistance element 10*a* of the printing heating unit 10 of the thermal head 9, which is in contact with the printing ribbon 7, is heated to fuse and transfer the corresponding portion of the fusible ink layer 7*b* to the recording sheet 14. Accordingly, desired characters, symbols and numerals can be printed at desired position on the recording sheet 14 by selectively heating the desired heating resistance elements 10*a* among all the heating resistance elements 10*a* of the printing heating unit 10 and appropriately controlling the reciprocation of the carriagel 14 and the rotation of the sheet feeding shaft 12.

On the other hand, when misprints need to be corrected, first the carriage 4 and the sheet feeding shaft 12 are controlled so that the erasing heating unit 11 of the thermal head 9 is disposed opposite to the misprinted part with the erasing ribbon 8 therebetween. Then, the erasing ribbon 8 is wound from the erasing ribbon cassette 6 and energy is supplied to the erasing heating unit 11 to make the erasing heating unit 11 generate heat so that the thermoadhesive resin of the erasing ribbon 8 is fused and adheres to the misprinted part. After the fused thermoadhesive resin has been cooled, the misprinted part is lifted off from the recording sheet 14. During this erasing operation, the printing ribbon 7 is not wound and no energy is supplied to the printing heating unit 10 of the thermal head 9, and hence the printing heating unit is not heated.

Figure 5:
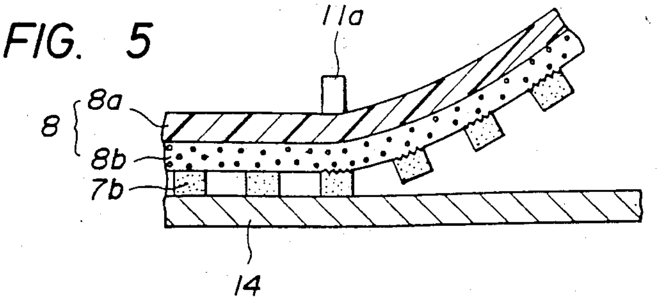
FIG. 5 is an enlarged sectional view of assistance in explaining the principle of lift-off erasing.

FIG. 5 is an enlarged sectional view of assistance in explaining the principle of such a lift-off erasing process. The erasing ribbon 8 is formed by coating a base film 8*a*, such as a polyester film, with a thermoadhesive resin layer 8*b* and is extended in contact with the the erasing heating unt 11 of the thermal head 9. The heating resistance elements 11*a* of the erasing heating unit 11 of the thermal head 9 are heated selectively, whereby the corresponding portions of the thermoadhesive resin layer are fused and adhere to the fusible ink printed on the recording sheet 14. Since both the adhesion of the thermoadhesive resin layer 8*b* to the base film 8*a* and the adhesion of the thermoadhesive resin layer 8*b* to the fusible ink layer 7*b* are higher than the adhesion of the fusible ink layer 7*b* to the recording sheet 14, the fusible ink misprinted on the recording sheet 14 is completely lifted off from the recording sheet 14 when the erasing ribbon 8 is separated from the recording sheet 14 after the heating of the erasing heating unit 11 has been interrupted and the thermoadhesive resin layer 8*b* fused and made to adhere to the fusible ink misprinted on the recording sheet 14 has been cooled.

As mentioned above, since the height of the erasing heating unit 11 of the thermal head 9 is greater than that of the printing heating unit 10 of the same, the misprinted area is completely covered with the corresponding erasing area, and hence incomplete erasing is surely obviated.

Generally, the melting point of the thermoadhesive resin of the erasing ribbon 8 is higher than that of the fusible ink of the printing ribbon 7, therefore, according to the present invention, the heating temperature of the erasing heating unit 11 is higher than that of the printing heating unit 10. Thus, since power supply to the thermal head 9 is controlled so that the heating output of the thermal head 9 is increased only in the erasing mode, the heating output of the thermal head 9 in the normal printing mode need not be increased, and hence the life of the thermal head 9 is extended.

After the misprinted portion has thus been erased, the recording sheet 14 is fed in the reverse direction to locate the erased portion opposite to the printing heating unit 10 of the thermal head 9 with the printing ribbon 7 therebetween, and then correct characters and symbols are printed in the erased portion to complete the correcting process.

As is apparent from what has been described hereinbefore, according to the present invention, the thermal head is provided with the printing heating unit and the erasing heating unit which is heated at a temperature higher than the printing heating temperature, and the misprinted portion is lifted off by heating the erasing ribbon with the erasing heating unit disposed in contact with the erasing ribbon. Therefore, characters and symbols misprinted on the recording sheet can be simply and surely erased, and thereby inefficient correcting operation such as handwriting is eliminated.

Although the invention has been described in its preferred form with a certain degree of particularity, it is to be understood that various changes and modifications may be made in the invention without departing from the spirit and scope thereof.

What is claimed is:

1. A thermal printer adapted to use a printing ribbon carrying a fusible ink layer for thermal printing on a recording sheet and an erasing ribbon carrying a thermoadhesive resin layer for lifting-off characters, symbols, numerals and the like misprinted on the recording sheet, said thermal printer comprises: a platen; a thermal head having a printing heating unit disposed opposite to the platen with the printing ribbon extended therebetween and capable of being applied to and heating the printing ribbon for printing operation, and an erasing heating unit disposed beside the printing heating unit and opposite to the platen with the erasing ribbon extended therebetween and capable of being applied to and heating the erasing ribbon for lift-off erasing operation; said printing heating unit being heated for normal printing operation for printing with the printing ribbon, said erasing heating unit being heated for lift-off erasing operation for lifting-off characters, symbols, numerals and the like misprinted on the recording sheet.

2. A thermal printer according to claim 1, wherein the heating temperature of the erasing heating unit is higher than that of the printing heating unit.

3. A thermal printer according to claim 1, wherein the adhesion of the thermoadhesive resin layer to the erasing ribbon and the adhesion of the thermoadhesive resin layer to the fusible ink are greater than the adhesion of the fusible ink to the recording sheet.

4. A thermal printer according to claim 1, wherein the area of each heating element of the erasing heating unit is greater than that of the corresponding heating element of the printing heating unit.

5. A thermal printer according to claim 1, wherein said printing ribbon and said erasing ribbon are wound individually.

* * * * *